United States Patent Office 3,459,501
Patented Aug. 5, 1969

3,459,501
METHOD FOR PREPARING HIGH-SILICA FAUJASITE
Charles J. Plank, Woodbury, and Edward J. Rosinski, Almonesson, N.J., assignors to Mobil Oil Corporation, a corporation of New York
No Drawing. Filed Oct. 30, 1964, Ser. No. 407,881
Int. Cl. C01b 33/28
U.S. Cl. 23—112                                               4 Claims

ABSTRACT OF THE DISCLOSURE

A method of preparing a solid crystalline aluminosilicate zeolite involving the use of a preformed silica-alumina hydrosol or a preformed all-embracing silica-alumina hydrogel as a source of silica and alumina.

---

This invention relates to methods of preparing crystalline aluminosilicates and to products obtained therefrom and, more particularly, to novel techniques for preparing crystalline aluminosilicates involving the use of silica-alumina hydrogels and hydrosols and to novel products obtained therefrom.

Zeolitic materials, both natural and synthetic, have been demonstrated in the past to have catalytic capabilities for various types of hydrocarbon conversion. Certain zeolitic materials are ordered crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SiO_4$ and $AlO_4$ tetrahedra in which the tetrahedra are cross-linked by the sharing of oxygen atoms whereby the ratio of the total aluminum and silicon atoms to oxygen atoms is 1:2. The electrovalence of the tetrahedra-containing aluminum is balanced by the inclusion in the crystal of a cation, for example, an alkali metal or an alkaline earth metal cation. This equilibrium can be expressed by formula wherein the ratio of $Al_2$ to the number of cations, such as Ca, Sr, $Na_2$, $K_2$ or $Li_2$, is equal to unity. One cation may be exchanged either in entirety or partially by another cation utilizing ion-exchange techniques. By means of such cation exchange, it is possible to vary the size of the pores in a given aluminosilicate by suitable selection of the particular cation. The spaces between the tetrahedra are occupied by molecules of water prior to dehydration. The parent zeolite is normally dehydrated to activate it for use as a catalyst.

A description of such zeolites is found in Patents 2,971,824 and 3,033,778, whose disclosures are hereby incorporated herein by reference.

In their hydrated form, the aluminosilicates may be represented by the formula:

$$xM_{2/n}O:Al_2O_3:ySiO_2:zH_2O$$

wherein M is a cation which balances the electrovalence of the tetrahedra, n represents the valence of the cation, y the moles of $SiO_2$ and z the moles of $H_2O$, the removal of which produces the characteristic open network system and which activates the aluminosilicate for use as a catalyst.

At the present time, a variety of such molecular sieves are available commercially. For example, molecular sieves are on the market which are known as the "X" series, such molecular sieves including materials which, expressed in terms of moles of oxides, have the following composition:

$$0.9 \pm 0.2 M_{2/n}O:Al_2O_3:2.5 \pm 0.5 SiO_2:zH_2O$$

wherein z is a value up to 8 depending upon the identity of M and degree of hydration of the crystal. A crystalline sodium aluminosilicate which has pores or channels of approximately 13 Angstrom units in diameter is available commercially under the name of molecular sieve 13X. As usually prepared, the 13X material contains water and has the unit cell formula $$Na_{86}[(AlO_2)_{86}(SiO_2)_{106}] \cdot 267H_2O$$

A synthetic zeolite known as molecular sieve 10X is a crystalline aluminosilicate having an effective pore diameter of about 10 Angstrom units and which has had a substantial proportion of its sodium ions replaced by calcium.

All of the molecular sieves of the X series have a crystal structure identical to that of faujasite, a naturally occurring aluminosilicate.

Still another synthetic aluminosilicate having the crystal structure of faujasite is that of the Y series which, expressed in oxide mole ratios, has the following formula:

$$0.9 \pm 0.2 Na_2O:Al_2O_3:ySiO_2:zH_2O$$

wherein y is a value ranging from 3 to 6 and z may be any value up to about 9.

Molecular sieves are ordinarily prepared initially in the sodium form of the crystal, the sodium ions in the resulting product being exchangeable for other cations as previously mentioned. In general, the process of preparation of such materials involves heating, in aqueous solution and under atmospheric pressure or less, an appropriate mixture of oxides or of materials whose chemical composition can be completely represented as a mixture of oxides $Na_2O$, $Al_2O_3$, $SiO_2$ and $H_2O$ at a temperature of approximately 21° C. to 150° C. and preferably 100° C. for periods of 15 minutes to 90 hours or more. The material which is first formed on mixing the reactants is an amorphous gel which, after the reaction has proceeded sufficiently, forms a crystalline product which may be separated therefrom and water washed until the water in equilibrium with the zeolite has a pH in the range of 9 to 12. The crystals are then dried at a temperature between 25° C. and 150° C. After activating by heating until dehydration is attained, i.e., at 350° C. and 1 mm. pressure, the substance is ready for use.

The stability of the crystalline aluminosilicates in the presence of heat, steam and acid, as well as their catalytic properties in general, are to a great extent dependent upon the silica/alumina ratio in the crystal lattice of the aluminosilicate. Generally speaking, the higher the silica/alumina ratio in the aluminosilicate, the greater the stability to heat, steam and acid. In view of this fact, there are a variety of applications for which crystalline aluminosilicates having too low a silica/alumina ratio are inappropriate.

The present invention provides a novel method for synthesizing crystalline aluminosilicates having higher silica/alumina ratios than might otherwise be obtainable from a starting mixture having given oxide ratios. In its broadest characteristics, this method comprises providing at least a portion of the silica and alumina content of the reaction mixture used in carrying out the method through a component which was at least at some point prior to the formation of the desired crystalline aluminosilicate a silica/alumina hydrogel or hydrosol.

It is accordingly a primary object of the present invention to provide a novel method for preparing crystalline aluminosilicates.

It is still another important object of the present invention to provide a novel method for the preparation of highly siliceous crystalline aluminosilicates.

It is still a further object of the present invention to provide a novel method of preparing highly siliceous crystalline aluminosilicates involving the provision of at least a portion of the silica and alumina content of the reaction mixture used in carrying out the synthesis by means of a component which was at least at some point prior to the formation of the desired crystalline aluminosilicate a preformed all-embracing silica-alumina hydrogel.

It is still a further object of the present invention to provide a novel method of preparing highly siliceous crystalline aluminosilicates having a faujasitic crystal structure involving the provision of at least a portion of the silica and alumina content of the reaction mixture used in carrying out the synthesis by means of a component which was at least at some point prior to the formation of the desired crystalline aluminosilicate a preformed all-embracing silica-alumina hydrogel.

It is another object of the present invention to provide a novel method of preparing a crystalline aluminosilicate having a higher silica/alumina ratio involving the use of a preformed silica-alumina hydrosol as a source of silica and alumina, said silica-alumina hydrosol having been derived from a preformed all-embracing silica-alumina hydrogel.

It is a further important object of the present invention to provide a novel method for the preparation of crystalline aluminosilicates involving providing at least a portion of the silica and alumina content of the reaction mixture used in carrying out the synthesis through a component which was at least at some point prior to the formation of the desired crystalline aluminosilicate a silica-alumina hydrogel or hydrosol, said hydrogel or hydrosol having a limited pH.

It is another object of the present invention to provide a novel method of preparing crystalline aluminosilicates involving the admixture of an alkali with amorphous silica-alumina under crystallization conditions to form the desired crystalline aluminosilicate, the amorphous silica-alumina being constituted by a material which was at least at some point prior to the addition of the alkali a preformed hydrosol or all-embracing silica-alumina hydrogel.

It is a further object of the present invention to provide a novel plural step method of preparing crystalline aluminosilicates involving the admixture of an alkali with amorphous silica-alumina under crystallization conditions to form the desired crystalline aluminosilicate, the amorphous silica-alumina being constituted by a material which was at least at some point prior to the addition of the alkali a preformed hydrosol or all-embracing silica-alumina hydrogel, the silica-alumina component being mixed with said alkali in at least two stages, approximately 10–50% by weight of said silica-alumina component being mixed with the alkali in the first stage and the balance thereafter.

It is still another object of the present invention to provide a novel method of preparing a crystalline aluminosilicate having a higher silica/alumina ratio involving the use of a preformed silica-alumina hydrogel or hydrosol as a source of silica and alumina.

It is a further object to provide a method of preparing a hydrocarbon conversion catalyst and products obtained therefrom, said method comprising forming a crystalline aluminosilicate through use of a preformed silica-alumina hydrosol or hydrogel and converting the hydrosol or hydrogel to the desired catalyst by exchanging at least a portion of its original cations with cations adapting the crystalline aluminosilicate for use in said hydrocarbon conversion.

It is still another important object of the present invention to provide a novel method for forming highly siliceous crystalline aluminosilicates involving the use of a specified reaction mixture at least a portion of which is constituted by a component which was at least at some point prior to the formation of the desired crystal-hydrosol or all-embracing silica-alumina hydrogel, said hydrogel or hydrosol having been formed from a reaction mixture having a limited pH and having a micellar particle size such that, if dried and calcined, its surface area is at least a minimum specified amount.

It is still a further important object of the present invention to provide a novel method of synthesizing a high-silica crystalline aluminosilicate involving the use of a component which was at least at some point prior to the formation of the desired crystalline aluminosilicate a preformed silica-alumina hydrosol or all-embracing silica-alumina hydrogel, the reaction mixture from which the desired crystalline aluminosilicate is to be crystallized being aged for a sufficient period of time at a temperature substantially below the digestion temperature, following which the reaction mixture is digested at a temperature sufficiently elevated to permit crystallization of the desired aluminosilicate to take place.

It is a further important object of the present invention to provide a novel method of synthesizing highly siliceous crystalline aluminosilicates in which at least some of the silica content and substantially all of the alumina content of the reaction mixture is supplied by a component which was at least at some point prior to the formation of the desired crystalline aluminosilicate a preformed silica-alumina hydrosol or all-embracing silica-alumina hydrogel.

These and other important objects and advantages of the present invention will become more apparent through reference to the ensuing description and appended claims.

As previously indicated, a broad aspect of the process of the present invention is the synthesis of crystalline almuinosilicates utilizing as a source of silica and alumina a component which was at least at some point prior to the formation of the desired crystalline aluminosilicate either a silica-alumina hydrogel or a silica-alumina hydrosol. When a hydrogel is employed, such hydrogel should preferably be a preformed, all-embracing hydrogel. By "all-embracing" (as used in this specification and claims) applicants intend to cover hydrogels in which essentially all of the liquid (i.e., such as water and other water-soluble materials) is present in the gelatinous structure, as distinguished from a gelatinous precipitate having supernatant liquid.

Crystalline aluminosilicates which are most advantageously prepared by the novel process of the present invention are those having a faujasitic crystal structure, the general formula for which may be represented as follows in terms of moles of oxides:

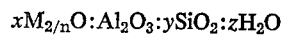

$$xM_{2/n}O:Al_2O_3:ySiO_2:zH_2O$$

wherein M is a metal cation (preferably sodium); $n$ represents the valence of M; $x$ is about $0.9\pm0.2$; $y$ is at least about 3.6; and $z$ is up to about 9. The process of the present invention is particularly suited for making crystalline aluminosilicates having the above general formula but in which $y$ is at least 4.

In order to obtain the most satisfactory crystalline aluminosilicates, the silica-alumina hydrogel or hydrosol should be prepared at a pH of no more than about 12, with most effective results being obtained at pH's of approximately 4–11. With higher pH's (i.e., when excess alkali is used in the hydrogel or hydrosol mixture), a product having a silica/alumina ratio of less than 4 is likely to result. The preferred technique for preparing the preformed silica-alumina hydrogel or hydrosol involves the mixing of water glass and $Al^{+3}$ salt solutions to obtain a mixture having the desired resultant pH. When sodium aluminate is the source of alumina, the hydrosol or hydrogel is best prepared by mixing three streams: the water glass, sodium aluminate and an acid solution.

Best results are obtained when all of the alumina which is desired in the aluminosilicate crystallization medium is included in the preformed hydrogel or hydrosol. Furthermore, the preformed silica-alumina hydrogel or hydrosol should have a micellar particle size such that, if dried and calcined, its surface area is greater than 50 m.$^2$/g., preferably greater than 100 m.$^2$/g. This condition is not met in a mixture having too high a pH. It is an important characteristic of the method of the present invention that the use of a preformed silica-alumina hydrosol or all-embracing silica-alumina hydrogel makes it possible to preform the silica-alumina particles into the desired micellar particle structure.

For most effective results, the constituency of the crystallization mixtures used in the methods of the present invention should be approximately as follows (expressed in terms of oxide mole ratios):

$Na_2O/SiO_2$ ---------------------------- 0.2/1–0.9/1
$SiO_2/Al_2O_3$ ---------------------------- 5/1–50/1
$H_2O/Na_2O$ ---------------------------- 15/1–100/1

The preferred composition of the crystallization mixtures, again expressed in terms of approximate oxide mole ratios, is as follows:

$Na_2O/SiO_2$ ---------------------------- 0.25/1–0.8/1
$SiO_2/Al_2O_3$ ---------------------------- 5/1–25/1
$H_2O/Na_2O$ ---------------------------- 25/1–90/1

Optimum oxide mole ratios are approximately as follows:

$Na_2O/SiO_2$ ---------------------------- 0.25/1–0.55/1
$SiO_2/Al_2O_3$ ---------------------------- 5/1–20/1
$H_2O/Na_2O$ ---------------------------- 35/1–90/1

For most effective results in the practice of the present invention it is preferred that the alkaline dispersion containing the crystallization mix components be aged for approximately 20–80 hours at a temperature substantially below the digestion temperature. A satisfactory aging temperature is room temperature. Acceptable digestion temperatures are from 150–220° F., the crystallization mix being digested for a sufficient period of time to permit the desired crystalline aluminosilicate to crystallize.

In the preferred embodiment of the present invention, the hydrogel or hydrosol is introduced into the crystallization mixture as part of a two-step process. In the first step, about 10–50% by weight of the hydrosol or hydrogel is mixed vigorously with the alkaline component to produce a fluid mixture, preferably of low viscosity. To this fluid mixture, the balance of the hydrogel is added to complete the crystallization mixture.

The following examples will serve to illustrate the novel processes of the present invention.

PREPARATION OF HIGH-SILICA FAUJASITE FROM $SiO_2/Al_2O_3$ HYDROSOLS

Silica-alumina hydrosols used in the following preparation were prepared using an $NH_4OH$ peptization method. Here the hydrogel was a silica-alumina Durabead 1. [Note.—The "Durabead 1" ("DB–1") preparation is made by dispersing dried aluminosilicate catalyst fines into a silicate solution and then mixing with an acid alum solution at 8.5 pH. The hydrosol so formed is made into bead hydrogel by the conventional bead-forming method. The hydrogel is then heat treated at 110° F. for six hours followed by base exchange with aluminum sulfate and ammonium sulfate to reduce the sodium to low residual level. The bead hydrogel is then washed free of sulfate ion. This wet sodium and sulfate free hydrogel contained 11.5 wt. percent solids (determined at 1000° F.). These solids analyzed 90.9 wt. percent $SiO_2$, 8.93% $Al_2O_3$ and 0.17 wt. percent Na. The hydrogel form of this catalyst was used in the preparation of the crystalline high silica faujasite described in the ensuing examples. A more complete description of the DB–1 hydrogel is set forth in Patent No. 2,900,349, whose disclosure is hereby incorporated by reference.]

Example 1

The silica-alumina hydrosol used in this preparation was prepared by peptizing 4400 g. DB–1 hydrogel (77.5% matrix, 94% $SiO_2$—6% $Al_2O_3$+22.5 wt. percent dryer fines; total composition 11.5% solids, 90.9% $SiO_2$, 8.93% $Al_2O_3$; this hydrogel was processed by aluminum sulfate base exchange) with 2000 cc., 10% $NH_4OH$ for 21 hours at 200° F. The resulting hydrosol was separated from the settled bead fines by decantation and then evaporated to 15.9 wt. percent solids (determined at 1000° F.) under vacuum.

The above silica alumina hydrosol (513 g.) was reacted with 30.0 g. $NaAlO_2$ (43.4% $Al_2O_3$), 17.8 g. NaOH, 50 cc. $H_2O$ (calculated molar ratio of 0.298 $Na_2O/SiO_2$, $SiO_2/Al_2O_3$ of 5.92/1, 73.2/1 $H_2O/Na_2O$) for 10 minutes, aged for 24 hours at room temperature, followed by digestion at 200° F. for 192 hours. The resulting faujasite product was separated from the supernatant liquid by filtration and washing. The product analyzed 10.4 wt. percent Na, 20.8 wt. percent $Al_2O_3$ and 64.7 wt. percent $SiO_2$, with a 5.35 molar ratio of $SiO_2/Al_2O_3$. The synthetic faujasite further had a 12.4 wt. percent cyclohexane adsorption capacity and by X-ray analyzed 70% shift and 55% crystallinity. [Note.—The conditions under which the sorption of cyclohexane and water were determined both above and elsewhere in this specification were as follows: a weighed sample is contacted with the desired pure adsorbate vapor in an adsorption chamber at a pressure less than the vapor-liquid equilibrium pressure of the adsorbate at room temperature. This pressure is kept constant (20 mm. with cyclohexane; 12 mm. with water) during the adsorption period. Adsorption is complete when constant pressure is reached. The increase in weight is calculated as the adsorption capacity of the sample. "Crystallinity" as used in this specification is determined by comparison with a commercial 13X aluminosilicate as 100% crystalline.]

Example 2

This preparation was made in a manner similar to Example 1 by first forming the silica-alumina hydrosol from a hydrogel. The hydrosol was prepared by contacting 5.89 lbs. DB–1 Al-exchanged hydrogel with 1000 cc. 10% $NH_4OH$ for 170–180 hrs. at 200° F., then decanting the hydrosol from the unaffected dryer fines in the DB–1 hydrogel, then increasing the solids by evaporating to 14 wt. percent $SiO_2$ (at 1000° F.). Then 595 g. of this concentrated silica-alumina hydrosol was mixed with a solution of 17.8 g. NaOH (77.5 wt. percent $Na_2O$) and 30 g. $NaAlO_2$ (43% $Al_2O_3$) in 50 cc. water for 10 minutes. The initial reaction was conducted at room temperature for 21 hours and then for 192 hours at 200° F. The starting mixture was (expressed in terms of oxide mole ratios) 0.3 $Na_2O/SiO_2$, 5.73 $SiO_2/Al_2O_3$ and 88.2 $H_2O/Na_2O$.

The synthetic faujasite product analyzed 11.4 wt. percent Na, 23.1 wt. percent $Al_2O_3$, 62.6 wt. percent $SiO_2$ and had a $SiO_2/Al_2O_3$ ratio of 4.62. The final product gave a cyclohexane adsorption capacity of 17.6 wt. percent and by X-ray analysis gave a 90% shift and 70% crystallinity.

CONVERSION OF HYDROGELS TO SYNTHETIC FAUJASITES

It is shown here that hydrogels can be converted to synthetic faujasites by the reaction of the hydrogels with caustic or with caustic-aluminate solution at 200° F.

Example 3

This example was conducted by reacting 500 g. 12 P.C. commercial bead hydrogel (known as Sor-Bead-R hydrogel), containing on the dehydrated basis 97% $SiO_2$—3% $Al_2O_3$, with 7.8 g. sodium aluminate, 36.5 g. NaOH (77.5% $Na_2O$) and 300 cc. water. [Note.—"P.C." represents "product concentration," which is actually the solids concentration. Product concentration=gms. $SiO_2$—$Al_2O_3$/100 cc. of hydrogel (or sol).] The process involved dissolving the 36.5 g. NaOH in 150 cc. water in a Waring Blendor and adding the 500 g. bead hydrogel along with additional 100 cc. water. To this was then added the 7.8 g. sodium aluminate in 50 cc. water. The starting molar composition ratio at this point was 0.51/1 $Na_2O/SiO_2$, 19.1/1 $SiO_2/Al_2O_3$, and 83.3/1 $H_2O/Na_2O$. This slurry was heat treated over a weekend (72 hours) at 200° F. Following the heat treatment the supernatant liquid was decanted and the crystalline aluminosilicate was washed with water. The crystalline aluminosilicate was analyzed for cyclohexane adsorption capacity giving 9.9 wt. percent adsorption and by X-ray analysis gave 75% shift and 55% crystallinity.

Examples 4–7

Examples 4 to 7 in Table 1 were prepared by reacting Durabead 1 hydrogel at various caustic to silica, silica to alumina, and water to caustic ratios. All of these examples were prepared by adding caustic as sodium hydroxide and silica as N-Brand silicate as indicated to adjust the $SiO_2/Al_2O_3$ ratio and adjusting the dilution by adding water. In each case 1000 g. of DB-1 hydrogel was used. To this were added the amounts of caustic and N-brand silicate indicated in Table 1. Each of the mixtures was homogenized by mixing vigorously in a Waring Blendor. Following the homogenization the mixture was digested for 21 hours at 200° F. The resulting product was separated from the supernatant liquid by filtration and washing.

Examples 4–7 show that the caustic to silica molar ratio can be varied from 0.66 to 0.83 $Na_2O/SiO_2$ and still yield synthetic material having good adsorptive properties, 13 to 17 wt. percent cyclohexane adsorption, and (by X-ray analysis) showing good crystalline shift to high silica faujasite (50 to 60%) and excellent crystallinity (70 to 90%) for high silica faujasites. This appears to be true for the examples prepared with a $SiO_2/Al_2O_3$ variation of 17.2/1 to 40.5/1 while the dilution was essentially constant at 30 to 54/1 $H_2O/Na_2O$.

TABLE 1

[Conversion of DB-1 Hydrogel to High Silica Faujasite; Effect of $SiO_2/Al_2O_3$ and $Na_2O/SiO_2$]

| Example No. | 4 | 5 | 6 | 7 |
|---|---|---|---|---|
| Description: | | | | |
| Starting Mixture: | | | | |
| DB-1,[1] wt. g. | 1,000 | 1,000 | 1,000 | 1,000 |
| NaOH, wt. g. | 116 | 169 | 116 | 188 |
| N-Brand Silicate,[2] wt. g. | 162 | 486 | 54.1 | |
| Starting Composition, Mole Ratio: | | | | |
| $Na_2O/SiO_2$ | 0.66 | 0.705 | 0.79 | 0.825 |
| $SiO_2/Al_2O_3$ | 24.8 | 40.5 | 19.8 | 17.2 |
| $H_2O/Na_2O$ | 33–50 | 33.5 | 33.5 | 33–54 |
| Reaction, Digestion: | | | | |
| Time, Hrs. | 21 | 21 | 21 | 21 |
| Temp., °F. | 200 | 200 | 200 | 200 |
| Adsorption: Cyclohexane, wt. percent | 13–16 | 15.6 | 15.9–16.9 | 15.9–17.3 |
| X-ray Analysis: | | | | |
| Type | [3] F | F | [4] F+ | [4] F |
| Shift, percent | 60 | 50 | 55 | 55 |
| Crystallinity, percent | 70 | 75 | 80 | 90 |

[1] DB-1 hydrogel containing 11.5% solids, 90.9 wt. percent $SiO_2$, 8.92 wt. percent $Al_2O_3$.
[2] Contains 28.9% $SiO_2$, 9% $Na_2O$ and 62.1% $H_2O$.
[3] Faujasite.
[4] Trace P.

Examples 8–13

Examples 8–13 summarized in Table 2 illustrate the effect of caustic-to-silica ratio at several dilutions along with the effect of $NH_4OH$ pretreatment and room temperature pre-aging. These preparations were also made in essentially the same manner as Examples 4 to 7, differing in the fact that the DB-1 hydrogel was first pretreated with 10% $NH_4OH$ solution in Examples 8 to 10 and with 20% $NH_4OH$ in preparing Examples 11 to 13. The $NH_4OH$ pretreat was at 200° F. only for 2 hours after which the solution was decanted and the hydrogel was used in the preparation of Examples 8 to 13. Each of these examples was prepared by adding the caustic to a small amount of bead hydrogel, heating to form the fluid slurry, then adding the rest of the hydrogel to this slurry with continued agitation. These were then digested as indicated in Table 2.

Examples 8 to 13 show that synthetic faujasite having 4 to 4.6 $SiO_2/Al_2O_3$ molar ratio with 80 to 90% shift and 45 to 65% crystallinity was prepared using these hydrogels and at the compositions described under Examples 9, 11 and 12. These results were obtained at a starting composition caustic ratio of 0.47 $Na_2O/SiO_2$, $SiO_2/Al_2O_3$ of 17.2/1 and 60/1 $H_2O/Na_2O$. Higher levels of caustic to silica ratio of 0.84 result in shorter crystallization time (21–44 hours) and product having lower shift (40–50%).

TABLE 2

[Conversion of DB-1 Hydrogel to High Silica Faujasite (Effect of Dilution and $Na_2O/SiO_2$)]

| Example No. | 8 | 9 | 10 | 11 | 12 | 13 |
|---|---|---|---|---|---|---|
| Description | DB-1 hydrogel treated with 10% $NH_3OH$[1] for 2 hours at 195° F. prior to Caustic Reaction. | | | Same as (1) but 20% $NH_4OH$ used. | | |
| Starting Mixture: | | | | | | |
| DB-1 wt., g.[2] | 200 | 200 | 200 | 200 | 200 | 200 |
| NaOH, wt. g. | 13.1 | 13.1 | 23.2 | 13.1 | 13.1 | 23.2 |
| Starting Composition, Mole Ratio: | | | | | | |
| $Na_2O/SiO_2$ | 0.47 | 0.47 | 0.84 | 0.47 | 0.47 | 0.84 |
| $SiO_2/Al_2O_3$ | 17.2 | 17.2 | 17.2 | 17.2 | 17.2 | 17.2 |
| $H_2O/Na_2O$ | 60 | 60 | 33.9 | 60 | 60 | 33.9 |
| Reaction: | | | | | | |
| Aging: | | | | | | |
| Time, Hrs. | None | 21 | None | None | 21 | 21 |
| Temp., °F. | None | [3] RT | None | None | RT | RT |
| Digestion: | | | | | | |
| Time, Hrs. | 168 | 144 | 44 | 120 | 144 | 21 |
| Temp., °F. | 194 | 194 | 194 | 194 | 194 | 194 |
| Product Composition: | | | | | | |
| Na, wt. percent | | 10.5 | | 10.3 | 10.9 | |
| $Al_2O_3$, wt. percent | | 23.0 | | 25.3 | 23.6 | |
| $SiO_2$, wt. percent | | 62.1 | | 60.3 | 60.8 | |
| $SiO_2/Al_2O_3$, Mole Ratio | | 4.6 | | 4.06 | 4.39 | |
| Adsorption: Cyclohexane, wt. percent | 8.9 | 13.3 | 13.7 | 9.2 | 12.8 | 13.7 |
| X-ray Analysis: | | | | | | |
| Type | [4] F | F | F | F | [4] F | [4] F |
| Shift, percent | 80 | 80 | 40 | 90 | 80 | 50 |
| Crystallinity, percent | 50 | 65 | 75 | 45 | 65 | 65 |

[1] 1,200 g. DB-1 processed hydrogel (beads to dryer) plus 10% $NH_4OH$ solution treated for 2 hours then solution decanted.
[2] DB-1 hydrogel contining 11.5% solids, 90.9% $SiO_2$, 8.92% $Al_2O_3$.
[3] Room temperature.
[4] Trace P.

Example 14

This example shows that at a $Na_2O/SiO_2$ molar ratio of 0.47/1 and about 60/1 $H_2O/Na_2O$ starting mixture, the $SiO_2/Al_2O_3$ ratio can be decreased to as low as 11/1 and still yield a reasonable product as measured by cyclohexane adsorption capacity of 11.9 wt. percent.

TABLE 3
[Conversion of DB-1 Hydrogel to High Silica Faujasite (Effect of $SiO_2/Al_2O_3$ Ratio)]

| Example No. | 9 | 14 |
|---|---|---|
| Description | (1) | (2) |
| Starting Mixture: | | |
| DB-1 Hydrogel wt. g.[3] | 200 | 200 |
| NaOH, wt. g | 13.1 | 12.05 |
| $NaAlO_2$, wt. g | | 2.6 |
| Starting Composition, Mole Ratio: | | |
| $Na_2O/SiO_2$ | 0.47 | 0.47 |
| $SiO_2/Al_2O_3$ | 17.2 | 11.1/1 |
| $H_2O/Na_2O$ | 60/1 | 60.2 |
| Reaction: | | |
| Aging: | | |
| Time, Hrs | 21 | 21 |
| Temp., °F | RT | RT |
| Digestion: | | |
| Time, Hrs | 144 | 120 |
| Temp., °F | 194 | 200 |
| Product Composition: | | |
| Na, wt. percent | 10.5 | 10.4 |
| $Al_2O_3$, wt. percent | 23.0 | 23.0 |
| $SiO_2$, wt. percent | 62.1 | 62.1 |
| $SiO_2/Al_2O_3$, Mole Ratio | 4.6 | 4.55 |
| Adsorption: Cyclohexane, wt. percent | 13.3 | 11.9 |
| X-ray Analysis: | | |
| Type | [4] F+ | [4] F+ |
| Shift, percent | 80 | 85 |
| Crystallinity, percent | 65 | 55 |

[1] See Table 2.
[2] Same as the hydrogel used in Example 9 but without the $NH_4OH$ treatment.
[3] DB-1 hydrogel containing 11.5% solids, 90.9% $SiO_2$, 8.93% $Al_2O_3$
[4] Trace.

Examples 15–19

These examples show the effect of dilution on product composition and synthetic faujasite quality. At the 0.815 $Na_2O/SiO_2$ molar ratio a dilution of about 35/1 to 65/1 $H_2O/Na_2O$ was studied. In this study higher dilution favors increased shift or higher silica faujasite preparation. However, even though the digestion time was increased to 96 hours the product crystallinity was still low suggesting that still longer digestion times are necessary for high shift and high crystallinity product at the higher dilutions. Higher dilutions also give higher $SiO_2/Al_2O_3$ in the product as shown by Example 17 compared to Example 15. With a 0.46/1 $Na_2O/SiO_2$ a reasonable product was formed at 28.3/1 $H_2O/Na_2O$ giving 60% shift and 60% crystallinity. At this caustic to silica ratio, higher shift product was obtained at 60/1 ratio of $H_2O/Na_2O$, as shown by Example 9, Table 3.

TABLE 4
[Conversion of DB-1 Hydrogel to High Silica Synthetic Faujasite]

| Example No. | 15 | 16 | 17 | 18 | 19 |
|---|---|---|---|---|---|
| Description | (1) | (1) | (1) | (1) | (2) |
| Starting Mixture: | | | | | |
| DB-1 Hydrogel, wt. g | 200 | 200 | 200 | 200 | 52.6 |
| NaOH, wt. g | 23.2 | 23.2 | 23.2 | 23.2 | 6.6 |
| $H_2O$, vol | | 54 | 115 | 135 | |
| Starting Composition, Mole Ratio: | | | | | |
| $Na_2O/SiO_2$ | 0.815 | 0.815 | 0.815 | 0.815 | 0.46 |
| $SiO_2/Al_2O_3$ | 17.3/1 | 17.3/1 | 17.3/1 | 17.3/1 | 17.3/1 |
| $H_2O/Na_2O$ | 34.6 | 45.3 | 57 | 65 | 28.3 |
| Reaction: | | | | | |
| Aging: | | | | | |
| Time, Hrs | | | | | 21 |
| Temp., °F | | | | | RT |
| Digestion: | | | | | |
| Time, Hrs | 44 | 44 | 72 | 96 | 44 |
| Temp., °F | 198 | 198 | 198 | 198 | 200 |
| Product Composition: | | | | | |
| Na, wt. percent | 11.2 | | 10.2 | | 10.5 |
| $Al_2O_3$, wt. percent | 25.0 | | 24.0 | | 25.2 |
| $SiO_2$, wt. percent | 58.1 | | 60.1 | | 59.4 |
| $SiO_2/Al_2O_3$, Mole Ratio | 3.86 | | 4.25 | | 4.0 |
| Adsorption: Cyclohexane wt. percent | 13.9 | 12.1 | 8.8 | 6.2 | 16.1 |
| X-ray Analysis: | | | | | |
| Type | [3] F+ | [3] F+ | [3] F+ | [3] F+ | [3] F+ |
| Shift, percent | 60 | 70 | 80 | 80 | 60 |
| Crystallinity, percent | 80 | 65 | 50 | 30 | 60 |

[1] Bead Plant DB-1 Processed Hydrogel.
[2] Hydrogel evaporated to 21.9% solids under vacuum; this Bead plant Hydrogel contained 11.5% solids, 90.9% $SiO_2$, 8.93% $Al_2O_3$.
[3] Trace P.

Examples 20–27

These examples serve to demonstrate that high silica faujasite can be made having high shift (100%), good crystallinity (60% crystallinity) and high $SiO_2/Al_2O_3$ ratio (5.72) using a high P.C. (12.7), fairly high alumina content (6.42% $Na_2O$, 8.38% $Al_2O_3$, 85.2% $SiO_2$) silica-alumina hydrogel.

The high P.C. silica-alumina hydrogel was prepared mixing the following solutions:

(A) Acid solution:
  51.0 lbs. water
  11.45 lbs. $Al_2(SO_4)_3 \cdot 18H_2O$
  3.32 lbs. $H_2SO_4$ (97.6%)
  Sp. gr. 1.129 at 84° F.

(B) Silicate solution:
  34.42 lbs. N-brand silicate (28.9% $SiO_2$, 9% $Na_2O$, 62.1% $H_2O$)
  23.34 lbs. water
  1.62 lbs. NaOH (77.5% $Na_2O$)
  Sp. gr. 1.236 at 80° F.

These solutions were mixed together through a mixing nozzle by adding 398 cc. per minute of solution (B) at 38° F. to 326 cc. per minute of acid solution (A) at 41° F., forming an 8.3 to 9.0 pH hydrosol which set to a firm gel in about 1 sec. at 50° F. This hydrosol was formed into a bead hydrogel by the conventional bead forming method.

The analyzed composition of this bead hydrogel after slight wash was 6.42 wt. percent $Na_2O$, 8.38 wt. percent $Al_2O_3$, 85.2 wt. percent $SiO_2$, 127 g. $SiO_2+Al_2O_3$ per liter of sol.

This hydrogel was used in the preparation of Examples 20 to 27.

The bead hydrogel used in the preparation of Examples 20 to 25 was not base exchanged while the bead hydrogel used in Examples 26 and 27 was base exchanged with aluminum sulfate prior to use.

In the preparation of Examples 20 to 25, caustic and aluminate were added as indicated in Table 5. The same procedure was used here as previously described for DB-1 hydrogel conversion. The caustic is slurried with a small amount of bead hydrogel heated to make the slurry. To this slurry is added the remainder of bead hydrogel. Without a homogenizer it was preferred to use this approach, since it is desirable to keep the solids content at maximum level. The slurried caustic-hydrogel mixture can be aged at room temperature (Examples 24, 25, 26 and 27), then digested at elevated temperature (200° F.) until the desired crystalline product is obtained.

The data presented in Table 5 show that it is possible now to react at low caustic to silica ratios of 0.33 $Na_2O/SiO_2$ added caustic, at 17.4/1 $SiO_2/Al_2O_3$ and maximum dilution of 63/1 $H_2O/Na_2O$. At these conditions we have made a high shift (100%) product (Examples 20 and 25) with good crystallinity (60% in Example 24) while Example 20 required additional digestion. In addition, the product (Example 24) analyzed 5.72 $SiO_2/Al_2O_3$ and had a 17.9 wt. percent cyclohexane adsorption.

Using a higher caustic to silica ratio in a starting mixture of total sodium 0.486/1 $Na_2O/SiO_2$ (Example 21), the resulting product had a lower shift (70%) and reasonable crystallinity (65%).

Decreasing the $SiO_2/Al_2O_3$ ratio to 11.8/1 and 5.78/1 in preparing Examples 22 and 23 gave a reasonable product as measured by cyclohexane adsorption (9.3 and 11.1 wt. percent adsorption). A 5.78/1 $SiO_2/Al_2O_3$ ratio, using a room temperature pre-age treatment in preparing Example 25, gives a low silica faujasite (3.4 $SiO_2/Al_2O_3$) in the product, but reasonable shift (60%) and crystallinity (90%).

Similar results were also obtained with the exchanged high P.C. silica-alumina bead hydrogel at the 0.455 $Na_2O/SiO_2$ and 10.1/1 and 5.05/1 $SiO_2/Al_2O_3$ ratios (Examples 26 and 27).

It will be noted from the data of Table 5 that generally best results are obtained when all the alumina desired in the reaction mixture is included in the initial hydrogel, not added as $NaAlO_2$.

(B) Silicate solution:
54.65 wt. percent Q brand silicate (28.7 wt. percent $SiO_2$, 62.4 wt. percent $H_2O$, 8.9 wt. percent $Na_2O$)
42.8 wt. percent water TABLE 5
[Conversion of High P.C. $SiO_2/Al_2O_3$ Hydrogel to High Silica Synthetic Faujasite; Effect of $Na_2O/SiO_2$, $SiO_2/Al_2O_3$]

| Example No. | 20 | 21 | 22 | 23 | 24 | 25 | 26 | 27 |
|---|---|---|---|---|---|---|---|---|
| Description | | | $SiO_2/Al_2O_3$ Hydrogel [1] | | | | $SiO_2/Al_2O_3$ Hydrogel [2] | |
| Starting Mixture: | | | | | | | | |
| $SiO_2/Al_2O_3$ Hydrogel, wt. g | 200 | 200 | 200 | 200 | 200 | 200 | 100 | 100 |
| $NaOH$ [3], wt. g | 8.49 | 13.75 | 12.70 | 9.42 | 8.49 | 9.42 | 6.6 | 4.96 |
| $NaAlO_2$ [4], wt. g | | | 2.6 | 11.2 | | 11.2 | | 4.25 |
| Starting Composition, Mole Ratio: | | | | | | | | |
| $Na_2O/SiO_2$ [5] | 0.331 | 0.486 | 0.486 | 0.489 | 0.331 | 0.489 | 0.455 | 0.455 |
| $SiO_2/Al_2O_3$ | 17.4 | 17.4 | 11.8 | 5.78 | 17.4 | 5.78 | 10.1 | 50.5 |
| $H_2O/Na_2O$ | 62.8 | 46.7 | 47.6 | 47.3 | 62.8 | 47.3 | 58.5 | 58.5 |
| Reaction: | | | | | | | | |
| Aging: | | | | | | | | |
| Time, Hrs | | | | | 21 | 21 | 21 | 21 |
| Temp., °F | | | | | RT | RT | RT | RT |
| Digestion: | | | | | | | | |
| Time, Hrs | 120 | 120 | 120 | 120 | 192 | 192 | 240 | 240 |
| Temp., °F | 200 | 200 | 200 | 200 | 200 | 200 | 200 | 200 |
| Product Composition: | | | | | | | | |
| Na, wt. percent | 10.1 | 11.7 | 10.7 | 11.9 | 6.5 | 12.5 | 10.7 | 13.7 |
| $Al_2O_3$, wt. percent | 19.2 | 23.8 | 25.2 | 27.4 | 9.8 | 27.3 | 22.8 | 25.1 |
| $SiO_2$, wt. percent | 66.4 | 59.3 | 59.0 | 55.4 | 66.7 | 54.3 | 60.5 | 56.7 |
| $SiO_2/Al_2O_3$ Mole Ratio | 5.9 | 4.06 | 3.98 | 3.44 | 5.72 | 3.4 | 4.51 | 3.84 |
| Adsorption, Cyclohexane, wt. percent | 6.5 | 11.4 | 9.3 | 11.1 | 17.9 | 15.7 | 12.0 | 15.6 |
| X-ray Analysis: | | | | | | | | |
| Type | [6] F+ | [6] F+ | [6] F+ | [6] F+ | [6] F+ | [6] F+ | [6] F+ | [6] F+ |
| Shift, percent | 100 110 | 70 75 | 70 | 50 | 100 | 60 | 50 | 70 |
| Crystallinity, percent | 25 20 | 65 55 | 35 | 55 | 60 | 90 | 80 | 60 |

[1] $SiO_2/Al_2O_3$ hydrogel containing 15.51% solids, 7.82% $Al_2O_3$, 79.6% $SiO_2$, 6.45% Na, 4.41 wt. percent $SO_4$.
[2] $SiO_2/Al_2O_3$ hydrogel base exchanged with aluminum sulfate containing 12.9% solids, 14.2% $Al_2O_3$, 84.9% $SiO_2$, 0.01% Na.
[3] NaOH (77.5% $Na_2O$).
[4] $NaAlO_2$ (43.4% $Al_2O_3$, 30% $Na_2O$).
[5] Calculated sodium ratio is based on the zeolitic sodium in the gel along with added caustic.
[6] Trace P.

CONVERSION OF DEHYDRATED SILICA-ALUMINA TO HIGH-SILICA SYNTHETIC FAUJASITE

As previously indicated, the preferred mode of carrying out the process of the present invention is to supply at least a portion of the silica and alumina content of the reaction mixture through a component which was at least at some point prior to the formation of the desired crystalline aluminosilicate either a silica-alumina hydrosol or a preformed, all-embracing silica-alumina hydrogel. With this limitation in mind, it is possible, after forming the necessary hydrogel or hydrosol, to convert it into another form prior to its introduction in to the crystallization mixture.

By way of illustration, Examples 28–31 set forth details of the conversion of a silica-alumina hydrogel to a silica-alumina xerogel and the use of the latter to form the desired high-silical crystalline aluminosilicate.

The direct use of xerogels in the reaction mixture actually forms an inventive concept over and above the use of preformed hydrogels as above-described and constitutes the subject matter of an application filed by Luther J. Reid, Jr. under the title "Method for Preparing Synthetic Crystalline Aluminosilicates," filed on Feb. 27, 1964, under Ser. No. 347,670. When the xerogel approach is used, it is desirable that the xerogel be formed by calcining the hydrogel at 1000° F. or higher (preferably at least 1250° F.) to make possible the obtaining of a product having good adsorptive properties.

Examples 28–31

In these examples, the calcined Durabead-5 silica-alumina catalyst product (xerogel) containing about 7½% by weight rare-earth exchanged X-type crystalline aluminosilicate is converted to the high-silica synthetic faujasite.

[Note.—The "Durabead-5" ("DB-5") fines used in the preparation of products described in the ensuing examples are prepared through admixture of solutions having essentially the following compositions:
(A) Acid alum solution:
90.91 wt. percent water
5.80 wt. percent $Al_2(SO_4)_3$
3.29 wt. percent $H_2SO_4$ 100%
Sp. gr. 1.084 at 60° F.

2.47 wt. percent NaOH
Sp. gr. 1.227 at 60° F.
(C) AFC slurry [code name for REX (rare earth-exchanged, X-type aluminosilicate) slurry]:
20 wt. percent REX (solids determined 2 hours at 650° F.) (size 4.7µ dw.)
80 wt. percent water
Sp. gr. 1.167 at 60° F.
(D) Recycle slurry:
20 wt. percent dryer fines (4.3µ dw.)
80 wt. percent water
Sp. gr. 1.134 at 60° F.

These solutions are mixed together generally in the following approximate ratios:

|  | Gals. |
|---|---|
| Acid alum solution | 1.0 |
| Silicate solution | 0.853 |
| AFC slurry | 0.051 |
| Recycle slurry | 0.188 |

The resulting hydrosol at 62° F. has a pH of 7.9 and is formed into bead hydrogel by a conventional bead forming method. The resulting bead hydrogel is processed in the following manner:

(1) Scrub tank—treat with 1.1 wt. percent $(NH_4)_2SO_4$ +75 p.p.m. of a polyoxyethylene alkyl phenol (a material sold by Atlas Powder and designated as G1690).

(2) Base exchanged, 5 stages, at 2 hour cycles, 35% $(NH_4)_2SO_4$ added at 22.4 gals./min.

(3) Water wash, 7 stages, at 2 hour cycles, 675 gals./min., wash water rate.

The processed hydrogel is dried in a commercial drier in a first stage at 270° F. and a second stage at 450° F. in a steam atmosphere. The dried bead catalyst is then jet milled to the approximate size of 2–4µ dw. The resulting powdered material is the Durabead-5 (DB-5) described in the ensuing examples.]

[Note.—Unless otherwise indicated, $RECl_3$ when used in this specification shall refere to a mixture of rare earth chlorides consisting essentially of the chlorides of lanthanum, cerium, neodymium and praseodymium, with minor amounts of samarium, gadolinium and yttrium. A rare earth chloride solution containing such mixture is commercially available and it contains the chlorides of a rare earth mixture having the relative composition: cerium (as $CeO_2$) 48% by weight; lanthanum (as $La_2O_3$) 24% by weight; praseodymium (as $Pr_6O_{11}$) 5% by weight; neodymium (as $Nd_2O_3$) 17% by weight; samarium (as $Sm_2O_3$) 3% by weight; gadolinium (as $Gd_2O_3$) 2% by weight; yttrium (as $Y_2O_3$) 0.2% by weight; and other rare earth oxides 0.8% by weight. Similarly, the cation "RE" shall be construed to cover the same mixture of rare earth cations unless otherwise specified].

The process involves the pretreatment of dried DB-5 fines at elevated temperatures of 1000 to 1400° F., then reacting these calcined fines with caustic and aluminate solution. The mixture was first aged at room temperature for 24 hours, then at 200° F. for 96 to 192 hours. The resulting product is separated from the supernatant liquid in the usual manner described previously.

Data presented in Table 6 show that calcining of the xerogel to at least 1000° F. is extremely desirable and yields a good adsorptive product, as shown by Example 28. Calcination at 1400° F. shows quite consistent results, giving products having an $SiO_2/Al_2O_3$ ratio of 4.19 to 4.69 (Examples 29, 30 and 31). These examples also had excellent cyclohexane adsorption (17.2 to 19.2 wt. percent). X-ray analysis shows 60 to 85% shifted product with 55 to 75% crystallinity.

The above data conclusively demonstrate that high-silica faujasite can be made from tempered (calcined) DB-5 product when the DB-5 fines are tempered first and then reacted at proper caustic to silica ratio of 0.801 or less.

TABLE 6

[Conversion of DB-5 Fines to High Silica Synthetic Faujasite]

| Example No. | 28 | 29 | 30 | 31 |
|---|---|---|---|---|
| Description | DB-5[1] Catalyst Fines | | | |
| Tempering, °F | 1,000 | 1,400 | 1,400 | 1,400 |
| Starting Mixture: | | | | |
| DB-5, wt. g | 24.4 | 24.4 | 69.8 | 24.4 |
| NaOH[2], wt. g | 22.0 | 11.6 | 25 | 12.1 |
| NaAlO₂[3], wt. g | 2.64 | 2.64 | 11.6 | |
| H₂O, vol | 207.6 | 114 | 260 | 113 |
| Starting Composition, Mole Ratio: | | | | |
| Na₂O/SiO₂ | 0.801 | 0.435 | 0.358 | 0.425 |
| SiO₂/Al₂O₃ | 9.5 | 9.5 | 8.2 | 13.6 |
| H₂O/Na₂O | 40.3 | 40.6 | 39.3 | 41.7 |
| Reaction: | | | | |
| Aging: | | | | |
| Time, Hrs | 21 | 21 | 21 | 21 |
| Temp., °F | RT | RT | RT | RT |
| Digestion: | | | | |
| Time, Hrs | 192 | 192 | 96 | 168 |
| Temp., °F | 200 | 200 | 200 | 200 |
| Product Composition: | | | | |
| Na, wt. percent | 10.9 | 12.2 | 10.7 | 11.1 |
| Al₂O₃, wt. percent | 24.3 | 23.6 | 22.6 | 22.5 |
| SiO₂, wt. percent | 59.9 | 58.4 | 62.3 | 66.6 |
| (RE)₂O₃ wt. percent | 1.24 | 1.23 | 0.94 | 1.57 |
| SiO₂/Al₂O₃, Mole Ratio | 4.19 | 4.19 | 4.69 | 4.59 |
| Adsorption, Cyclohexane, wt. percent | 17.9 | 17.2 | 19.2 | 17.6 |
| X-Ray Analysis: | | | | |
| Type | F | [4]F+ | [5]F+ | [4]F+ |
| Shift, percent | 70 | 60 | 85 | 70 |
| Crystallinity, percent | 55 | 75 | 70 | 65 |

[1] DB-5 0.38 Na, 88.3% SiO₂, 0.81% (RE)₂O₃, 11.0 Al₂O₃.
[2] 77% Na₂O.
[3] 30% Na₂O, 43.4% Al₂O₃.
[4] Trace unidentified.
[5] Trace P.

PREPARATION OF DURABEAD CATALYST USING HIGH SILICA FAUJASITE DERIVED FROM DURABEAD 1 HYDROGEL

Examples 32–35

The high silica faujasites used to prepare the catalysts summarized in Tables 7, 8 and 9 were prepared as described in Example 9. This was prepared by reacting NH₄OH-pretreated Durabead 1 hydrogel with NaOH. The relative wt. ratios are: 200 g. DB-1 hydrogel treated for 2 hours at 200° F. with 10% NH₄OH using ½ volume solution per volume of hydrogel. To this treated hydrogel (after the solution was drained off) was added 13.1 g. NaOH (77.5 wt. percent Na₂O). The method of slurrying was to add all the caustic to about ¼ the bead hydrogel, which was heated to effect solution. This was then added to the remaining hydrogel and mixed to form a homogeneous slurry. This slurry was aged at room temperature for 21 hours, followed by 144 hour digestion at 200° F. for complete crystallization.

The large batch of high silica faujasite prepared as described above analyzed 9.55 wt. percent Na, 23.3 wt. percent $Al_2O_3$, 63.0 wt. percent $SiO_2$, with a calculated $SiO_2/Al_2O_3$ molar ratio of 4.62 and by X-ray was 80% shifted to Y and 75% crystalline.

This high-silica faujasite was incorporated in the sodium form in preparing catalysts of Examples 32, 33, 34 and 35 summarized in Table 7. In preparing Examples 36 and 37 (Table 8) this same faujasite was first exchanged with combined 5% $RECl_3 \cdot 6H_2O + 2\%$ $NH_4Cl$, reducing the residual sodium to 0.74% and incorporating 16.3 wt. percent $(RE)_2O_3$, then incorporated in a silica-alumina rare earth matrix. The rare earth—$NH_4Cl$ exchanged faujasite was also evaluated in undiluted form. The results are summarized in Table 9 as Example 38.

The hydrogel preparation in these examples, incorporating the sodium form, was made by a conventional bead forming technique and involved incorporating 10 wt. percent active component along with 15% McNamee clay in a silica-alumina matrix.

The resulting bead hydrogel made by the conventional bead forming method was base exchanged as described in Table 7.

Catalytic evaluations summarized in Table 7 also show that the resulting rare earth catalysts (Examples 32 and 33) containing the high silica sodium faujasite derived from Durabead 1 hydrogel are superior to REX (rare earth exchanged, X-type aluminosilicate) Durabead catalyst. This superiority is in $C_{5+}$ gasoline advantage of about +2 to +3 volume percent. This is comparable to selectivity advantages usually shown by Durabead catalysts prepared from similar faujasites derived from Ludox. ["Ludox" is a silica sol having a particle size of approximately 170 A. prepared by an ion exchange technique.] Example 34 also confirms that the Durabeads containing the acid form of this faujasite are reasonably stable to pressure steam at 15 p.s.i.g., which is characteristic of the acid form of crystalline high silica faujasites.

Example 35 is an example of divalent ion (Mn++) exchange of the high silica faujasite catalysts. This catalyst also shows characteristic catalytic selectivity advantage over REHX Durabead catalysts.

[Note.—The high catalytic activities obtained by aluminosilicate compositions prepared in accordance with the processes of the present invention can be readily illustrated in connection with the cracking of a representative hydrocarbon charge. In a number of the examples hereinafter set forth, the reference catalyst employed consisted of a conventional silica-alumina "bead"-type cracking catalyst containing approximately 10 wt. percent $Al_2O_3$ and the remainder $SiO_2$. The cracking activity of the catalyst [CAT-C evaluation] is further illustrated by its ability to catalyze the conversion of a Mid-Continent gas oil having a boiling range of 450–950° F. to gasoline having an end point of 410° F. Vapors of the gas oil are passed through the catalyst at a temperature of 900° F. substantially at atmospheric pressure at a feed rate of 2.0 to 16 volumes of liquid oil per volume of catalyst per hour and a 3.0 to 0.38 catalyst/oil ratio (product of C/O x LHSV=6) for 10 minutes. The method of measuring the crystalline aluminosilicates prepared by the processes of the present invention was to compare the various product yields obtained with such aluminosilicates with yields of the same products given by conventional silica-alumina catalysts at the same conversion level and at the same temperature. The difference (Δ values) shown hereinafter represent the yields given by the present catalysts minus yields given by the conventional catalysts. In these tests the catalyst compositions resuling from the processes of the present invention were precalcined at about 1000° F. prior to their evaluation as a cracking catalyst.]

TABLE 7
[Durabead Catalysts Prepared with High Silica Synthetic Faujasite]

| Example No | 32 | 33 | 34 | 35 |
|---|---|---|---|---|
| Forming pH | 8.3 | 8.3 | 8.3 | 8.3 |
| Description: | | | | |
| Matrix | $SiO_2/Al_2O_3$ (94% $SiO_2$–6% $Al_2O_3$) | | | |
| Fines: | | | | |
| (1) Type | High silica sodium faujasite [1] | | | |
| Conc | 10 | 10 | 10 | 10 |
| (2) Type | McNamee Clay | | | |
| Conc | 15 | 15 | 15 | 15 |
| Base Exchange: | | | | |
| Solution | (2) | (3) | (4) | (5) |
| Conc., wt. percent | | | 1 | 2 |
| Contacts Continuous,[6] hr | | | 1–24 | 1–24 |
| Composition: | | | | |
| Na, wt. percent | 0.25 | 0.22 | 0.27 | 0.2 |
| $(RE)_2O_3$, wt. percent | 3.38 | 3.52 | | |
| Mn, wt. percent | | | | 4.62 |
| Surface Area, m.²/g.: Steamed [7] | 161 | 178 | 108 | 203 |
| Catalytic Evaluation: [8] | | | | |
| Conditions: | | | | |
| LHSV | 4 | 4 | 4 | 4 |
| C/O | 1.5 | 1.5 | 1.5 | 1.5 |
| Conversion, vol. percent | 67.7 | 66.5 | 41.7 | 54.4 |
| $C_5+$ Gasoline, vol. percent | 55.9 | 54.8 | 34.7 | 45.2 |
| Total $C_4$'s, vol. percent | 15.1 | 14.8 | 9.5 | 10.6 |
| Dry Gas, wt. percent | 6.5 | 6.6 | 4.3 | 5.3 |
| Coke, wt. percent | 2.0 | 1.9 | 1.1 | 2.4 |
| $H_2$, wt. percent | 0.04 | 0.06 | 0.04 | 0.08 |
| Delta Advantage Over Si/Al: | | | | |
| $C_5+$ Gasoline, vol. percent | +9.5 | +9.0 | +2.7 | +5.7 |
| Total $C_4$'s, vol. percent | −3.9 | −3.8 | −0.5 | −3.8 |
| Dry Gas, wt. percent | −2.4 | −2.1 | −0.9 | −1.7 |
| Coke, wt. percent | −3.8 | −3.7 | −1.0 | −1.2 |
| $C_5+$ Gasoline Delta Over REHX-Durabead | +2.4 | +2.8 | | +0.7 |

[1] High silica sodium faujasite prepared from Durabead 1 hydrogel as described in Example 8 [$SiO_2/Al_2O_3$ 4.62/1; Cyclohexane adsorption 15.6; X-ray 80% shift; 75% crystallinity].
[2] 1–16 hour contact with 2% $RECl_3 \cdot 6 H_2O$ followed by continuous 24 hr. base exchange with 1% $NH_4Cl$.
[3] Same as (2) but Didymium chloride was used (low cerium rare-earth).
[4] $NH_4Cl$.
[5] $MnCl_2 \cdot 4 H_2O$.
[6] Where the contact of an aluminosilicate by treating solution is indicated to be "continuous" or otherwise similarly designated, this refers to a flowing system equivalent to ½ volume of solution per volume of catalyst per hour.
[7] Whenever it is indicated that a given catalyst has been "steamed", the catalyst has been treated with 100% steam at 1,200° F. and 15 p.s.i.g. for 24 hours.
[8] Prior to its evaluation, the catalyst was steamed for 24 hours at 1,200° F. and 15 p.s.i.g.

Examples 36 and 37

These examples serve to demonstrate that other methods of Durabead preparation using these synthetic faujasites also show the characteristic selectivity advantages for Durabead catalysts prepared using a high silica faujasite as active component.

In this case the matrix is a $SiO_2/Al_2O_3/RE$ and the active component was first pre-exchanged with rare earth and ammonium chloride to a low sodium level of 0.74% before incorporation into the matrix.

Details of forming these Durabead catalysts are presented since they differ from those normally used in preparting Durabead catalysts (see Examples 32–35). Examples 32–35 were prepared using a sodium form of active component incorporated into a silica-alumina matrix.

Examples 36 and 37 were prepared mixing the following solutions continuously through a nozzle:

(A) Acid solution:
   16.8 lbs. water
   1.04 lbs. $Al_2(SO_4)_3 \cdot 18H_2O$
   0.071 lbs. $RECl_3 \cdot 6H_2O$
   0.676 lbs. $H_2SO_4$ (97%)
   Sp. gr. 1.055 at 80° F.

(B) Silicate solution:
   (1) Silicate solution—
      7.75 lbs. N-brand silicate (28.9% $SiO_2$, 9% $Na_2O$, 62.1% $H_2O$)
      3.91 lbs. water
      0.558 lbs. McNamee clay
   (2) Faujasite slurry—
      3.65 lbs. water
      0.508 lbs. rare earth faujasite (63.7% solids at 1000° F.)

prepared from DB–1 hydrogel by a method similar to that of Example 9.

Solutions 1 and 2 were mixed together to form the silicate slurry solution having a sp. gr. of 1.200 at 74° F.

The above silicate slurry was mixed through a nozzle adding 452 cc. per min. at room temperature to 434 cc. per minute of acid solution containing rare earths at 41° F., forming 8.5 pH hydrosol. This hydrosol was formed into bead hydrogel by means of a conventional bead forming method. The bead hydrogel at this point had the following calculated composition: 70.14 wt. percent $SiO_2$, 3.67 wt. percent $Al_2O_3$, 0.743 wt. percent $(RE)_2O_3$, 10.18 wt. percent active rare earth faujasite, 15.27 wt. percent McNamee clay.

The freshly formed bead hydrogel was then base exchanged as described in Table 8. Example 36 was base exchanged continuously for 24 hours with an equivalent of 1.4% $(NH_4)_2SO_4$ and Example 37 was exchanged with a combined 1.4% $(NH_4)_2SO_4 + 0.2\%$ $RECl_3 \cdot 6H_2O$. The 24 hour continuous exchange is equivalent to 1 change of ½ volume solution per volume of hydrogel per hour.

The exchanged catalysts were washed sulfate free, dried at 270° F., tempered at 1000° F. and steamed for 24 hours at 1200° F. with 15 p.s.i.g. steam.

Catalytic evaluation of the steam catalysts summarized in Table 8 shows the typical catalytic superiority of high silica rare earth faujasite in Durabead catalysts. Regardless of whether the hydrogel was exchanged only with $(NH_4)_2SO_4$ (Example 36) or with the combined $(NH_4)_2SO_4 + 0.2RECl_3 \cdot 6H_2O$ (Example 37), similar $C_5+$ gasoline advantages were realized. This advantage was about 4.0 vol. percent $C_5+$ gasoline over REHX Durabead catalysts at the same conversion.

TABLE 8
[$SiO_2/Al_2O_3/RE$ Durabead Catalyst of the Pre-Exchanged Type (High Silica Faujasite from DB–1)]

| Example No | 36 | 37 |
|---|---|---|
| Forming pH | 8.5 | 8.5 |
| Description: | | |
| Matrix | $SiO_2/Al_2O_3/RE$ [94% $SiO_2$–5% $Al_2O_3$–1% $(RE)_2O_3$] | |
| Fines: | | |
| (1) Type | Rare Earth High Silica faujasite from DB–1 hydrogel | |
| Conc | 10 | 10 |
| (2) Type | McNamee Clay | |
| Conc | 15 | 15 |
| Base Exchange: | | |
| Solution | $(NH_4)_2SO$ | $(NH_4)_2SO_4 + RECl_3 \cdot 6 H_2O$ |
| Conc., wt. percent | 1.4 | 1.4   0.2 |
| Contacts Continuous, hr | 1–24 | 1–24 |
| Composition: | | |
| Na, wt. percent | 0.09 | 0.1 |
| $(RE)_2O_3$ | 2.30 | 4.79 |
| $Al_2O_3$, wt. percent | | |
| $SiO_2$, wt. percent | | |
| Surface Area, m.²/g., Steamed | 133 | 173 |
| Catalytic Evaluation: [1] | | |
| Conditions: | | |
| LHSV | 4 | 4 |
| C/O | 1.5 | 1.5 |
| Conversion, vol. percent | 66.0 | 65.5 |
| $C_5+$ Gasoline, vol. percent | 55.9 | 55.0 |
| Total $C_4$'s, vol. percent | 14.1 | 14.3 |
| Dry Gas, wt. percent | 5.9 | 6.2 |
| Coke, wt. percent | 1.5 | 1.6 |
| $H_2$, wt. percent | 0.04 | 0.05 |
| Delta Advantage Over Si/Al: | | |
| $C_5+$ Gasoline, vol. percent | +10.4 | +9.8 |
| Total $C_4$'s, vol. percent | −4.3 | −3.9 |
| Dry Gas, wt. percent | −2.7 | −2.4 |
| Coke, wt. percent | −4.0 | −3.8 |
| $C_5+$ Gasoline Delta Over REHX-Durabead | −4.3 | +4.0 |

[1] Prior to its evaluation, the catalyst was steamed for 24 hours at 1,200° F. and 15 p.s.i.g.

Example 38

This example serves to demonstrate that the undiluted high silica rare earth faujasite prepared from the Durabead 1 hydrogel in a manner similar to Example 9 has exceptional catalytic properties as evaluated by CAT–C. This high silica faujasite was the same material used in the preparation of the catalysts of Examples 36 and 37. This catalyst gave a +12.1 vol. percent $C_5+$ gasoline advantages over standard silica-alumina, which amounts to +5.7 advantages over REHX at the same conversion of 69.5 vol. percent at 16 LHSV.

TABLE 9.—RARE EARTH HIGH SILICA-FAUJASITE
(Faujasite prepared from Durabead 1)

Example 38

| | |
|---|---|
| Description of Na-faujasite starting material: | |
| Na, wt. percent | 9.55 |
| $Al_2O_3$, wt. percent | 23.3 |
| $SiO_2$, wt. percent | 63.0 |
| Shift, percent | 80 |
| Crystallinity, percent | 75 |
| Base exchange: | |
| Solution— | |
| Concentration, 5 wt. percent $RECl_3 \cdot 6H_2O$ | |
| Concentration, 2 wt. percent $NH_4Cl$ | |
| Contacts (No. X hrs.)—120 lbs. per 2 lbs. at 180° F. | |
| Composition (after base exchange): | |
| Na, wt. percent | 0.74 |
| $(RE)_2O_3$, wt. percent | 16.3 |
| Physical properties: | |
| Surface area, m.²/g., steamed | 417 (1) |
| Catalytic evaluation | |
| Conditions: | |
| LHSV | 16 |
| C/O | 0.38 |
| Conversion, vol. percent | 69.5 |
| $C_5+$ gasoline, vol. percent | 59.2 |
| Total $C_4$'s, vol. percent | 13.6 |
| Dry gas, wt. percent | 6.1 |
| Coke, wt. percent | 2.2 |
| $H_2$, wt. percent | 0.02 |
| Delta advantage over Si/Al: | |
| $C_5+$ gasoline, vol. percent | +12.1 |
| Total $C_4$'s, vol. percent | −6.1 |
| Dry gas, wt. percent | −3.1 |
| Coke, wt. percent | −4.0 |
| $C_5+$ gasoline delta over REHX | +5.7 |

¹ Prior to its evaluation, the catalyst was steamed for 24 hours at 1200° F. and 15 p.s.i.g.

The catalysts of Examples 32–38 clearly demonstrate that high silica faujasite derived from the caustic conversion of Durabead-1 hydrogel is quite satisfactory. They yield catalysts equal to the best rare earth-aluminosilicate catalysts we have made.

Crystalline aluminosilicate catalysts prepared in accordance with the present invention have a variety of catalytic uses, particularly in the field of hydrocarbon conversion. Merely by way of example, such catalysts find utility in catalyzing hydrocracking, alkylation, isomerization, hydrogenation, dehydrogenation and dehydrohalogenation reactions.

[Note.—When used in this specification and claims, the phrase "a source of silica and alumina" shall be construed to permit the use of other materials than those enumerated as a supplemental source of silica and/or alumina.]

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of synthesizing a high-silica faujasite the silica/alumina ratio of which is at least about 4 comprising preparing an alkaline reaction mixture having a composition expressed in terms of oxide mole ratios approximately as follows:

$Na_2O/SiO_2$ ---------- 0.2/1–0.9/1
$SiO_2/Al_2O_3$ ---------- 5/1–50/1
$H_2O/Na_2O$ ---------- 15/1–100/1 at least a portion of the silica and alumina content of said reaction mixture being supplied by a preformed all-embracing silica-alumina hydrogel; said hydrogel having been formed from a reaction mixture the pH of which was about 4–11; said hydrogel having a micellar particle size such that, if dried and calcined, its surface area is at least about 50 m.²/g.; and forming said high-silica faujasite by maintaining the resulting reaction mixture at a temperature and for a time sufficient to cause crystallization of said high-silica faujasite.

2. A method as defined in claim 1 wherein said hydrogel is added to said alkaline reaction mixture in at least two stages, approximately 10–50% by weight of said hydrogel being mixed with said alkaline reaction mixture in the first stage, the remainder of said hydrogel being thereafter added to said first stage mixture.

3. A method as defined in claim 1 wherein said reaction mixture has a composition expressed in terms of oxide mole ratios approximately as follows:

$Na_2O/SiO_2$ ---------- 0.25/1–0.8/1
$SiO_2/Al_2O_3$ ---------- 5/1–25/1
$H_2O/Na_2O$ ---------- 25/1–90/1

4. A method as defined in claim 1 wherein said reaction mixture has a composition expressed in terms of oxide mole ratios approximately as follows:

$Na_2O/SiO_2$ ---------- 0.25/1–0.55/1
$SiO_2/Al_2O_3$ ---------- 5/1–20/1
$H_2O/Na_2O$ ---------- 35/1–90/1

References Cited

UNITED STATES PATENTS

| | | | |
|---|---|---|---|
| 2,562,888 | 8/1951 | Bond | 252—453 |
| 2,900,349 | 8/1959 | Schwartz | 252—451 X |
| 3,065,054 | 11/1962 | Haden et al. | 23—112 |
| 3,119,660 | 1/1964 | Howell et al. | 23—112 |

EDWARD J. MEROS, Primary Examiner

U.S. Cl. X.R.

23—113

PO-1050
(5/69)

UNITED STATES PATENT OFFICE
CERTIFICATE OF CORRECTION

Patent No. 3,459,501       Dated August 5, 1969

Inventor(s) Charles J. Plank and Edward J. Rosinski

It is certified that error appears in the above-identified patent and that said Letters Patent are hereby corrected as shown below:

Column 4, lines 8-9, "crystal-hydrosol" should be --crystalline aluminosilicate either a preformed silica-alumina hydrosol--.

SIGNED AND
SEALED
APR 7 1970

(SEAL)
Attest:

Edward M. Fletcher, Jr.
Attesting Officer

WILLIAM E. SCHUYLER, JR.
Commissioner of Patents